US007970653B2

(12) United States Patent
Saukkonen et al.

(10) Patent No.: US 7,970,653 B2
(45) Date of Patent: Jun. 28, 2011

(54) ELECTRONIC AUTHORISATION

(75) Inventors: Topi Saukkonen, Oulu (FI); Virve Inget, Oulu (FI); Panu Markkanen, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 2046 days.

(21) Appl. No.: 10/178,936

(22) Filed: Jun. 20, 2002

(65) Prior Publication Data

US 2003/0027557 A1 Feb. 6, 2003

(30) Foreign Application Priority Data

Jun. 21, 2001 (GB) .................................. 0115234.7

(51) Int. Cl.
*G06Q 30/00* (2006.01)
(52) U.S. Cl. ................... 705/26; 705/1; 705/14; 705/18; 705/28; 705/29; 235/375; 235/383; 235/385; 235/438; 235/454; 235/462; 235/472
(58) Field of Classification Search .................. 705/26
See application file for complete search history.

(56) References Cited

U.S. PATENT DOCUMENTS

| 5,621,797 | A | * | 4/1997 | Rosen | 705/76 |
| 5,754,654 | A | * | 5/1998 | Hiroya et al. | 705/76 |
| 5,953,706 | A | * | 9/1999 | Patel | 705/6 |
| 6,026,375 | A | * | 2/2000 | Hall et al. | 705/26 |
| 6,595,417 | B2 | * | 7/2003 | O'Hagan et al. | 235/383 |
| 6,736,322 | B2 | * | 5/2004 | Gobburu et al. | 235/462.46 |
| 6,823,373 | B1 | * | 11/2004 | Pancha et al. | 709/219 |
| 6,845,361 | B1 | * | 1/2005 | Dowling | 705/5 |
| 6,850,901 | B1 | * | 2/2005 | Sykes et al. | 705/26 |
| 6,856,804 | B1 | * | 2/2005 | Ciotta | 455/435.1 |
| 6,920,431 | B2 | * | 7/2005 | Showghi et al. | 705/26 |
| 2002/0062249 | A1 | * | 5/2002 | Iannacci | 705/14 |

FOREIGN PATENT DOCUMENTS

| GB | 2347257 | 8/2000 |
| GB | 2351594 | 1/2001 |
| GB | 2357618 | 6/2001 |

OTHER PUBLICATIONS

"Products of the Year—Among the thousands of new products that appeared in 2000, the editors of Network Magazine recognize 34 that stand out from the rest.(News Briefs)." Network Magazine , p. 42 , May 1 , 2001.*

* cited by examiner

*Primary Examiner* — F. Zeender
*Assistant Examiner* — Fawaad Haider
(74) *Attorney, Agent, or Firm* — Ware, Fressola, Van Der Sluys & Adolphson LLP

(57) ABSTRACT

A method and system for identifying and transmitting data entities in a wireless communication system including at least one mobile user terminal. The method includes the steps of identifying a primary service to be provided, identifying a plurality of data entities associated with that service, selecting which of the plurality of data entities is to be transmitted and transmitting the selected data entities in a single transaction.

10 Claims, 4 Drawing Sheets

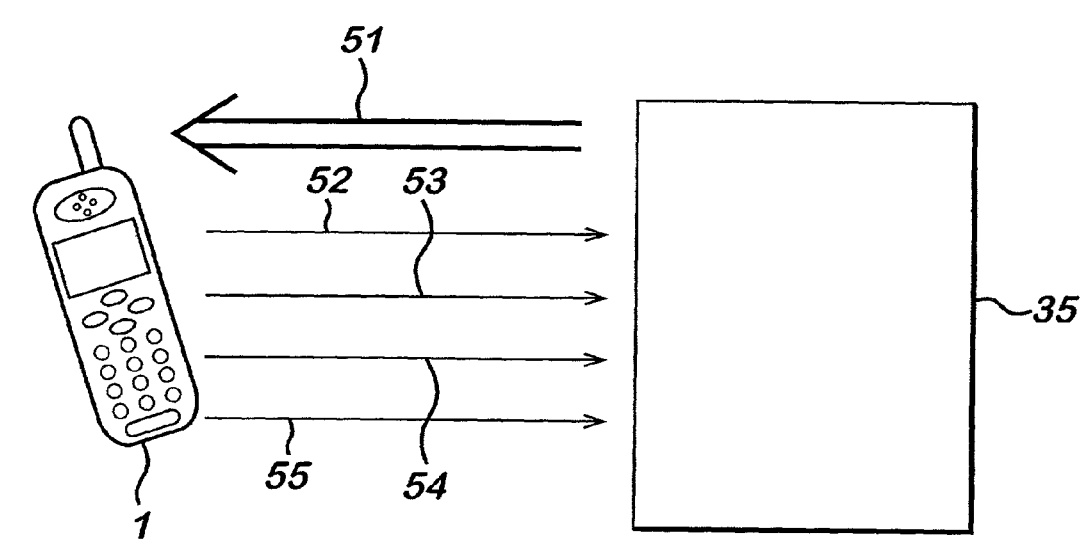
Fig. 5 *(Prior Art)*

ELECTRONIC AUTHORISATION

CROSS-REFERENCE TO RELATED APPLICATIONS

Priority is claimed from UK patent application No. 0115234.7 filed on Jun. 21, 2001.

TECHNICAL FIELD

The present invention relates to a method and apparatus for enabling the identification of associated data entities. In particular, but not exclusively, the present invention provides a way in which multiple users can gain access to a service using these associated data entities.

BACKGROUND OF THE INVENTION

It is well known by the skilled person that many services are available to users and that those users are often required to carry out some transaction prior to gaining access to those services. For example sports events or recreation events are attended by people who require tickets to access an arena or auditorium. Likewise users can obtain goods/items from a merchant point of sale but often only after paying for the goods/items. In this respect the term "service" will be understood to broadly cover any goods or services which a person may desire, require or be provided with. The term also will be understood to cover the provision of services and/or goods without the need for a prospective user to carry out some prior transaction, for example the provision of complimentary services.

In order to access these services a potential user of the service is often first supplied with a ticket. Conventionally this ticket will be in the form of a receipt, a voucher, a credit card slip or other and will be printed on a piece of paper, card, plastic or the like. Provision of such a ticket can be a time consuming process and such tickets are prone to being lost. In addition it is often necessary for a user to queue prior to obtaining the service to hand over the ticket at the point of sale or supply.

The Internet offers access to many sites over the world wide web (WWW) at which a user may carry out a transaction with a merchant to purchase or in other ways obtain a service. As a result of the transaction the user is provided with a ticket to access the service.

Various user equipment (UE) such as computers (fixed or portable), mobile telephones, personal data assistants or organisers and so on are also known to the skilled person and can be used to access the internet to obtain services. Mobile user equipment referred to as a mobile station can be defined as a means that is capable of communication via a wireless interface with another device such as a base station of a mobile telecommunication network or any other station. Such a mobile user equipment can be adapted for voice, text message or data communication via the wireless interface.

Mobile user equipment is rapidly evolving into more than a mere wireless telephone. Rather it is transforming into a personal trusted device (PTD) with the ability to provide a wide variety of services such as banking, payments, ticketing, and secure access based operations to a user. The result is a thriving mobile e-commerce market. A mobile electronic transaction (MeT) initiative has been set up to try to introduce standards for mobile phone functionality for carrying out mobile e-commerce. The MeT framework includes a requirement for the provision of secure mobile electronic transactions between a first party such as a user of the mobile user equipment (ME) and a second party such as a merchant offering services.

A user of the mobile user equipment may be provided with an electronic ticket (e-ticket) which is in the form of a data entity stored in the user equipment or in a device accessible by the user equipment. When a user of the user equipment wishes to access/obtain a service for which they have an e-ticket, they signal this via a user interface (UI) on the user equipment. The signal is transmitted to a device at a point of sale where the user can thereafter be provided with the service. Use of such an e-ticket obviates the requirement for a paper version and thus overcomes some of the aforementioned problems. However where more than one e-ticket is accessible to the user of the user equipment it has in the past been necessary to identify each e-ticket to be used separately one after another. This is a time consuming process. This is illustrated in FIG. 5 which illustrates how a mobile station 1 can communicate with a point of sale 35. Once the service and e-ticket (to enable access to that service) has been identified, the point of sale 35 signals to the mobile station. Thereafter a user may transmit e-tickets from the mobile station but only one at a time via separate signals (52, 53, 54, 55 for an example of the transmission of four e-tickets). This is very time consuming.

In addition a problem sometimes occurs when less than all of the e-tickets can be used at a particular time (for example when an event is full) so that only some of the users wishing to access a service can do so. This can potentially leave some users with no access to the service. For groups of users wishing to access a service together this is a particular problem.

SUMMARY OF THE INVENTION

It is an aim of embodiments of the present invention to at least partly mitigate the above referenced problems.

According to a first aspect of the present invention there is provided a method of identifying and transmitting data entities in a wireless communication system including at least one mobile user terminal, the method comprising:
 identifying a primary service to be provided;
 identifying a plurality of data entities associated with that service;
 selecting which of the plurality of data entities is to be transmitted; and
 transmitting the selected data entities in a single transaction.

Preferably such step of identifying data entities comprises:
 providing tag data in a tag field of each data entity stored in a data store;
 comparing the tag data with tag data corresponding to the identified service; and
 identifying the plurality of data entities in response to a match of tag data in the comparing step.

Conveniently, the method further comprising:
 providing the tag data corresponding to the identified service in a signal identifying the service to be provided.

Advantageously, the method further comprising:
 providing the user terminal with a display, and via this display, providing a user with an option to simultaneously select the plurality of data entities to be transmitted.

According to a second aspect of the present invention there is provided a mobile user terminal comprising:
 means to access a data store holding data entities;
 means for identifying a primary service to be provided;
 means for identifying in the data store a plurality of data entities associated with that service;

a user interface for enabling a user to select which of the plurality of data entities is to be transmitted; and a wireless interface and means for controlling the wireless interface to transmit the selected data entities in a single transaction.

Preferably the user interface further comprises;

a display via which a user can simultaneously select the plurality of data entities.

Conveniently the means for identifying a plurality of data entities comprises:

comparison means arranged to compare data in a tag field of each data entity with tag data corresponding to the identified service.

Advantageously each said data entity includes an authorisation field for enabling a user to be authenticated to access a service.

Embodiments of the present invention provide the advantage that a user of a user equipment does not have to separately select each e-ticket which is to be used on a particular occasion to access services.

Embodiments of the present invention also provide the advantage that a user of user equipment can simultaneously select to use more than one data entity at a point of sale or supply of a service. As a result the time taken to select use of the data entities to be used is reduced since each data entity does not need to be selected individually.

A user can be notified if access to the service is restricted in numbers thus preventing a group of users from being split. For example if a user wishes four people to access a service and a service is full or can only provide access to two people this can be signalled to the user via the user interface display.

Embodiments of the present invention also provide the advantage that data entities associated with a chosen data entity can be highlighted. This can act as a prompt to a user.

BRIEF DESCRIPTION OF THE DRAWINGS

For a better understanding of the present invention reference will now be made, by way of example only to the accompanying drawings in which:

FIG. 5 illustrates how user equipment can be used to access services according to the prior art.

BEST MODE FOR CARRYING OUT THE INVENTION

Figure 1:
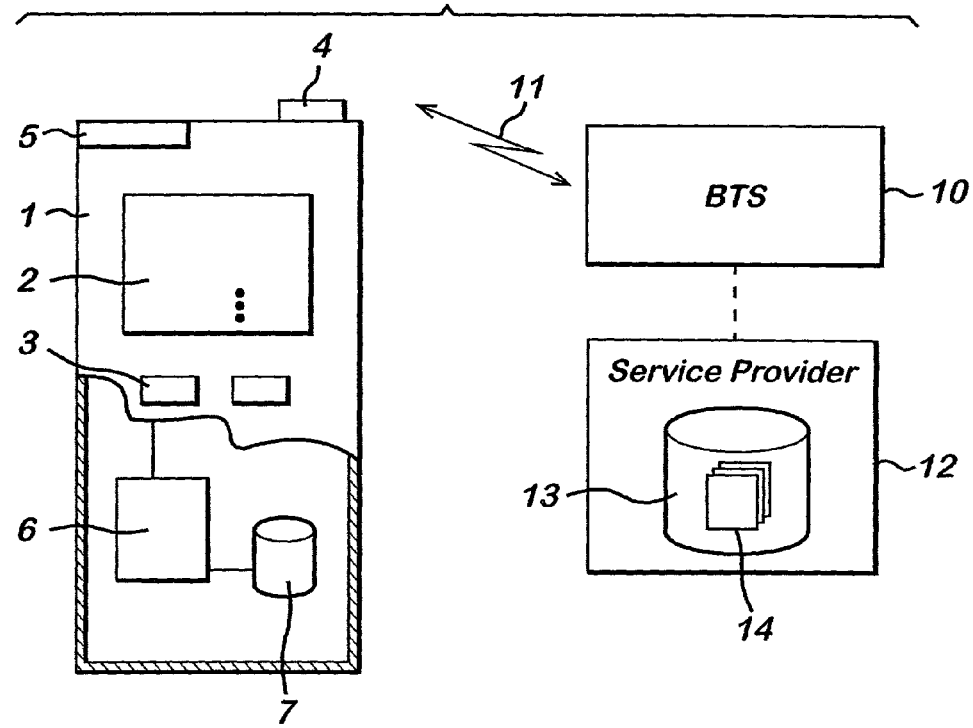
FIG. 1 illustrates user equipment.

In the drawings like reference numerals refer to like parity.

FIG. 1 shows a user equipment that may be used in the embodiments of the present invention. More particularly, FIG. 1 shows a partially sectioned mobile station 1 that may be used for communication over a wireless interface 11 with a transceiver element 10 of a mobile communication network. The transceiver elements and other components of the mobile communication network are known by the skilled person and are thus not shown in more detail than by block 10 for clarity reasons.

The mobile station 1 may be provided with user interface means comprising a display 2 and input means. The skilled person is familiar with the user interface of a mobile station and therefore these will not be described in more detail herein. It is sufficient to note that the input means may be formed by control buttons 3 or they may include e.g. voice activation or touch screen means and so on. The mobile station 1 may also be provided with communication interface means such as antenna means for communication with the transceiver entity 10. The antenna means may comprise an external antenna element 4, or built-in or integrated antenna means may be used. It should be appreciated that antenna means are not an essential for the operation of the present invention. As an example the mobile user equipment 1 could be provided with a wireless transmitter and/or receiver module 5. The module 5 is not for communication with the base station 10 of the cellular communication system, but is instead for the provision of a local communication link with a cooperative device. In this embodiment the data entities are not transmitted between the user equipment 1 and the service provider via the communication network 10. Instead, the communication occurs via local wireless links.

The module 5 may be based on use of infrared links, short range radio links, and so on. The infrared link may be based for example on the IrDA. The IrDA is a standard defined by infrared association. The short range radio link may be based for example on the Blutooth™ protocol. Other examples of the short range wireless interfaces are the ones based on technology used for the so-called contactless smart cards. A short range link for proximity cards is defined for example by the International Standardisation Organisation (ISO) specification number ISO 14443.

The term Blutooth™ refers to a technology specification by Blutooth Special Interest Group for small factor, low cost, short range radio links between various devices provided with a Blutooth wireless module. A feature of the Blutooth is that whenever two devices provided with a Blutooth module are within each others coverage area, one of the modules may detect the existence of the other module whereafter a connection may be established between them.

The mobile station 1 is adapted to facilitate use thereof for electronic transactions and for exchange of user information between the mobile station and a remote party. For example, the user of the mobile station 1 may pay for various goods and/or services by means of the mobile station 1 or access various banking or other financial services by the mobile station 1. To enable this the mobile station 1 may be provided with a credit card type transaction facility or account means wherein the user may load money. The balance can then be deducted from the account means whenever a payment is made. The mobile station 1 may also be used for transactions which include negotiating a purchase of goods and/or services, receiving a receipt of a purchase. Alternatively the mobile station can be used with any other operation where information associated with a transaction needs to be exchanged between the user and another party.

The mobile station 1 is shown to comprise a transaction processor function 6 and a transaction data storage means 7. The processor function 6 is for processing data and/or controlling reception and/or transmission of transaction data from and/or to the other parties. The processor function 6 may be integrated with at least one other processor function of the mobile station 1 or may be adapted to process data associated with electronic transactions only. The data storage means 7 may also be either integrated with at least one other function of the mobile station 1 or be assigned solely for storage of data that associates with the electronic transactions. Alternatively a data store may be external to the mobile station but accessible to it. Separation of the transaction functions from other functions of the mobile station 1 may be preferred e.g. for security or usability reasons.

In FIG. 1 the other party of a transaction is shown to comprise a "service provider". The service provider 12 shall be understood to represent any party that may exchange transaction data with the mobile station 1. In a practical implementation the service provider 12 may comprise a server 13 that is adapted for provision of commercial or non-commercial services for the user of the mobile station 1. As noted above the term services is used broadly to encompass any services, goods, items or facilities to which a user may want, or require, or be offered access.

If the mobile station 1 subscribes to a mobile communication network 10, the elements of this network may provide the communication means between the service provider 12 and the mobile station 1. Thus the user may access the services provided by the service provider entity 12 via the communication network. Messages may be transmitted between the mobile station 1 and the service provider 12 based on any appropriate transport system. Examples of these include Short Message Service (SMS), Wireless Application Protocol (WAP) and Internet protocol (IP).

The service provider entity 12 may comprise a site 14 that is implemented based on the Wireless Markup Language (WML) used for applications that are based on use of the wireless application protocol (WAP). However, such a site may also be based on any other appropriate means, such as any other markup language. The mobile station 1 may load transaction data from a page of the site. The user may be enabled to pull i.e. fetch or download a document such as an electronic order form, questionnaire, receipt and so on from the site 14. Alternatively the service provider entity 12 may push transaction data towards the user e.g. by means of a server 13.

Figure 2:
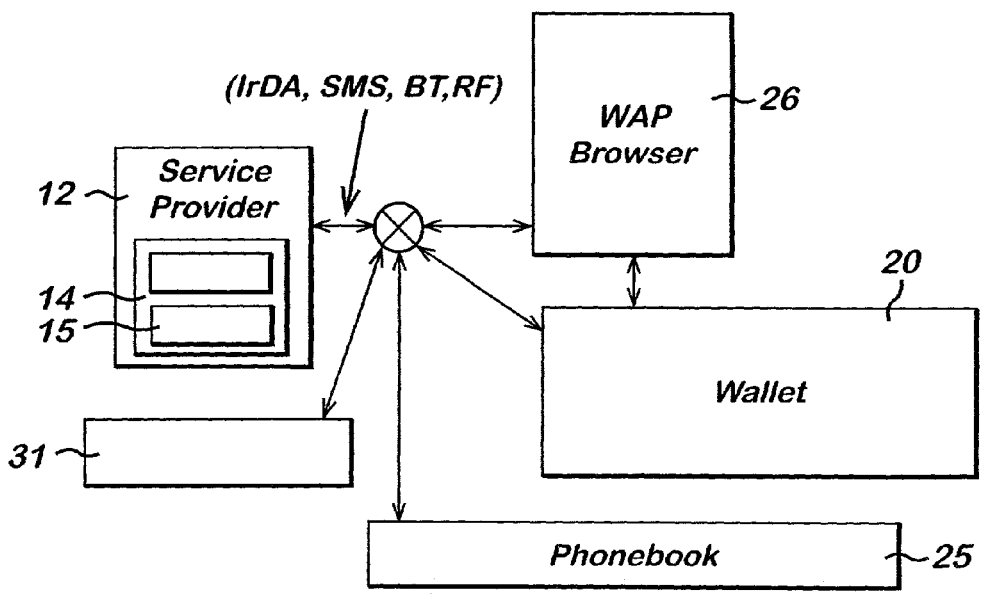
FIG. 2 illustrates use of the user equipment.

FIG. 2 discloses a possible architecture for a system providing electronic transaction processing. The system includes an 'electronic wallet'. The electronic wallet function is designated by block 20.

An electronic transaction handling facility can be implemented in the mobile station 1 by adding a transaction handling routine into the data card recognition software running in the processor means 6. The handling routine may be adapted to detect that an incoming data entity is a data entity that contains transaction information. The handling routine may then route the data entity to an appropriate processor or storage means. In FIG. 2 this software could be implemented in a splitter 30. The data handling routine may be adapted to detect that the incoming data entity contains information associated with the wallet function 20 and/or transactions and to route the data entity to an appropriate data storage means 31 or processor.

The wallet block 20 may be a self standing application and is adapted to understand the data card format. The communications can be directed directly from the splitter 30 to wallet block 20, as indicated by an arrow between blocks 30 and 20. The splitter 30 may route the transaction messages directly to wallet. The wallet 20 may then show information to user on a display portion of the user interface. The user may be asked to fill in data, accept data and so on.

Browser block 26 provided in the mobile station is also shown. The browser 26 may be used by the user for communication with a service provider server. The user may thus use the browser to pull i.e. download e.g. an order form, receipt or other transaction data from a service provider server or similar source. The user equipment may, for example, fetch an order form from the server, fill it in and transmit the completed order form back to the server to order goods specified in the form. Another example is download of bank account information (e.g. a statement) from a server of a bank. The user may also use the browser for searching possible new service providers, goods and/or services he may be interested in. The user may use the browser 26 to download a web page in response to selection of an indicator displayed to him/her on the display screen of the user equipment. The procedure of downloading information from a remote database is known and will thus not be explained in more detail.

FIG. 2 shows a service provider function block 12. The service provider function is shown to include a further block 14 that designates a form for use in the transaction that the user may download by means of the browser function 26. The form is shown to include data fields 15 to be filled in by the user. Required transaction information may include, for example, the name and address of the user, credit card number, passport number, telephone number, personal identity code and so on. This information may be stored in the wallet block 20.

The exchange of transaction information between the mobile station 1 and a server of the service provider may be by means of a standardised data entity that will be referred to in the following as an electronic data card. This can also be referred to as an authorisation data entity since its use can authorise a user to access services.

The service provider 12 may provide the mobile station 1 with transaction data such as a receipt based on an electronic data card content type. The transaction information can be transported to the mobile station 1 by adding the data on predefined data field of the data card.

An example of the electronic data card content type is an electronic business card. An example of the electronic business card applications available for the public is marketed under name 'vCard'. For example, in the WAP the vCard content type electronic business card is a mandatory feature and may thus be readily used also for exchange of transaction data. The vCard may be implemented on a WAP/WWW page as an object.

Thus, when generating the data entity to be transported from the service provider server to the mobile station 1, the service provider server may fill in the appropriate fields of the electronic data card by inserting data into appropriate fields. The electronic card can act as an electronic ticket which is stored in the mobile station so that subsequently when a user wishes to access a service the electronic ticket can be transmitted from the mobile station to a point of sale device which provides access to the user in response to the electronic ticket.

Thus subsequent to a user of the mobile station 1 identifying a service to which access is required they can signify this to the service provider 12 via the user interface 2, 3. Thereafter if there is a charge for the service the charge is deducted from the wallet 20 and an authorisation data entity in the form of an electronic ticket (e-ticket) or coupon which may be issued by the service provider is stored in a data store 31 in the mobile station 1. Alternatively the authorisation data entity may be stored in a data store external to the mobile station so long as the data stored in the data store is accessible by the processor of the mobile station and/or a point of sale device.

As noted above the e-ticket includes various data fields which include data identifying various features of the e-ticket for example the price, service provider or service for which the e-ticket may be used by a potential user or the service to gain access to the service. In addition the protocols for handling the e-ticket in accordance with embodiments of the present invention provide the e-tickets with tag portions. These are data fields which contain tag data associated with the service, or some other aspect of the transaction, which can be accessed by using the e-ticket.

A user may purchase, or be allocated with, or be given more than one e-ticket for accessing the same service or another service associated with the service. For example a user wishing to attend a sports event such as an ice hockey match may purchase more than one e-ticket. This might be to enable the user to attend with a number of other users such as family or friends. The e-tickets can be pre-purchased on separate occasions or at one time and the event organiser may wish to distribute a further service, such as a flag or drink to each user when they access the event. When the user books the e-tickets the event service provider can send both an e-ticket for the user to access the event and an e-ticket to issue a user with a complimentary flag or drink (which is an example of a (in this case complimentary) secondary service associated with the primary service).

Once a user desires use, the mobile station 1 can be used to transmit the e-tickets to a point of sale device 35. This can be done by a user identifying the required service via a menu based options list on the display of the user interface of the mobile station. The mobile station then transmits signals to the point of sale device which cooperates with the mobile station to provide the service and which then responds with a signal 36 confirming the entity of the service desired. Alternatively a user need not identify the service. This can be done instead by the point of service device once the mobile station is proximate to it. In this situation the signal 36 from the point of service 35 identifies the service. This signal may be continually transmitted so that all mobile stations near to the point of sale received the identity of the services associated with the point of sale device. Alternatively the point of sale device may check upon the mobile stations proximate to it and access a data store which identifies users and their associated mobile stations who have a data entity for providing authorisation to access those services. Each such identified mobile station could thereafter be transmitted signal 36.

Figure 3:
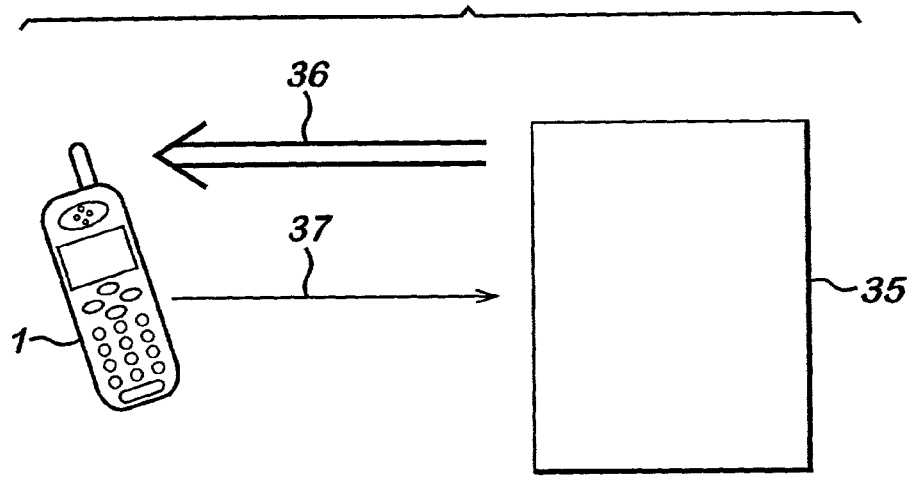
FIG. 3 illustrates how a user equipment can be used to access services.

FIG. 3 of illustrates how e-tickets or any other such data entity may be transferred in accordance with an embodiment of the present invention. As shown diagrammatically in FIG. 3A each e-ticket includes a tag field which includes tag data. e-tickets issued for a common service to a single user, or to multiple users, or for related services contain the same tag data.

The service is identified either by the user or point of sale device and the signal 36 is transmitted from the point of sale to the mobile station confirming this identity. The signal includes various data fields which each include specific data such as details of the service. In particular, this signal also includes a tag portion which includes tag data which can be matched with the tag data held in the tag field in each of the e-tickets stored in the mobile station.

Each of the e-tickets includes various data fields (two shown in the FIG. 3A) which can include data relating to any aspect of the e-ticket, for example, the price and/or period of time for which it is valid. Each e-ticket also includes a TAG portion. The tag portion is a data field which includes tag data. This tag data can be used to detect e-tickets which authorise access to a common service such as a primary service and/or to an associated secondary service. These can be identified by comparing the tags of the different e-tickets and detecting a match in data.

Figure 3A:
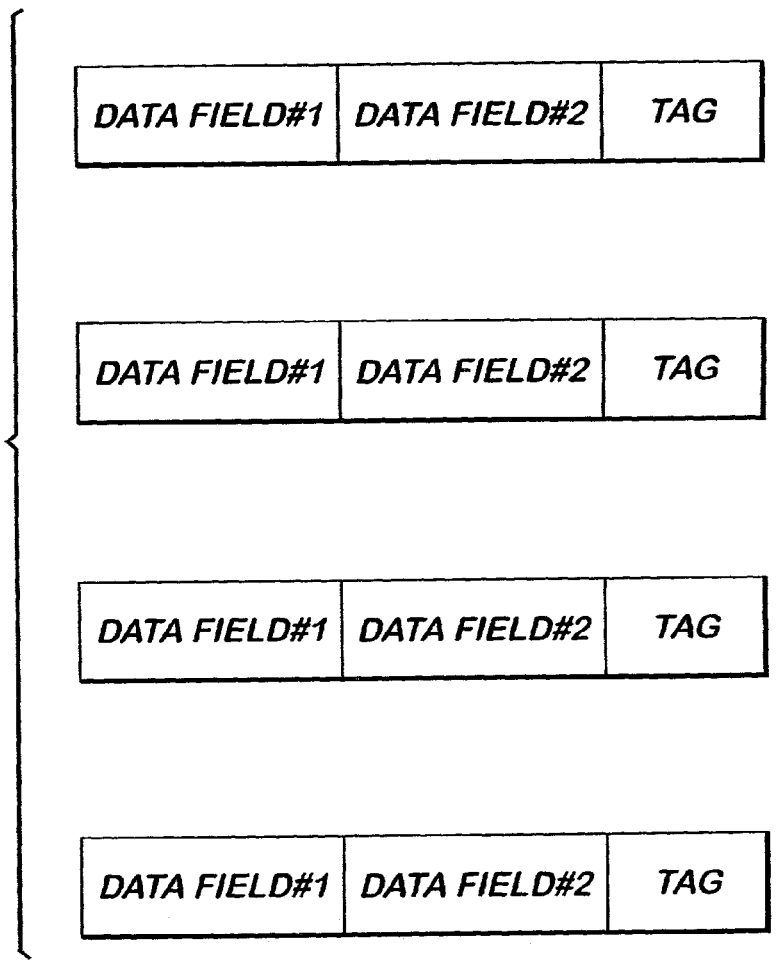
FIG. 3A illustrates data entities.

In response to receipt of the signal 36 processing means in the mobile station compares the tag field of e-tickets in the mobile station with the tag portion in the signal 36. In the example of FIG. 3A, where a mobile station having four e-tickets for the service provided by the point of sale device 35, four matches will be found. In response to this comparison the user of the mobile station can be provided, via the user interface, with the option of simultaneously selecting all, or more than one, or only one, or none of the e-tickets. If the user wishes to use all four e-tickets this can be signalled via the user interface and a single transmission 37 identifying all four tickets is transmitted from the mobile station 1 to the point of sale device 35. Upon receipt of the signal 37 the point of sale can provide access to the service, for example by allowing four people to access a building.

It will be understood that the present invention is not limited to the identification and use of e-tickets. Rather embodiments of the present invention can be used wherever multiple data entities are associated with a single user and a choice of using none, one or many of the data entities can be offered. For example, in the case of users being provided with multiple electronic keys to gain access to various respective services tag fields can be provided in those electronic keys to identify them as such or to identify a particular aspect of them. When a user wishes to use a key to access the respective service it is not necessary for each key to be used one by one. Rather all keys (identified by the tag data associated therewith), can automatically be identified and offered to the user for use. Alternatively only e-keys sharing a particular characteristic, as determined by the tag data, can be used.

This operation may be carried out in relation to a simplex operation in which a user only requires access to the service and is not concerned which of a plurality of data entities actually provides authorisation for that access. The invention is not however limited to such use.

Once the data entity used for authorising a user to access a service has been transmitted to the point of service it may be deleted from the data store. Alternatively some data entities may be for multiple use in which case a data field associated with that data entity is modified after use to highlight that use. As a further alternative the data entity may provide access to a user for a predetermined time period regardless of the number of uses. The date of use would need to be checked prior to the provision of access in this case.

Figure 4:
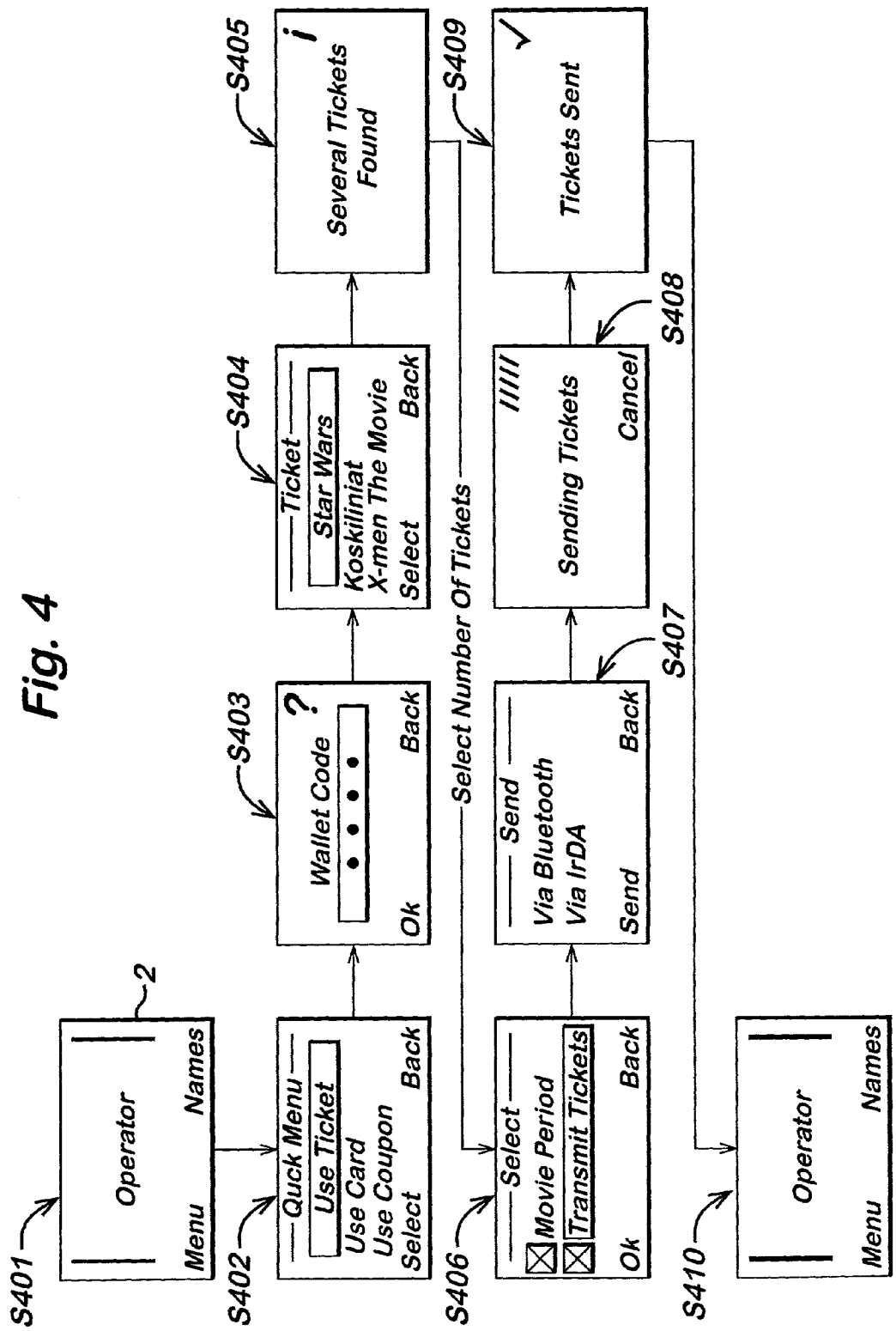
FIG. 4 illustrates how a user equipment can be used to access services.

FIG. 4 illustrates how an embodiment of the present invention can be used in the context of a visit to the cinema. The user interface on a mobile station 1 includes a display 2. This displays various information such as the network operator and options for a user as is known in the art. This information is displayed to the user at step S401. Prior to this step a user of the mobile station has obtained e-tickets for watching a film at the cinema. These tickets must be transmitted to a point of sale device at the cinema which, upon authorisation (by use of the e-ticket) will enable users to access the film. This point of service device may be situated at the entrance to the cinema complex or at the entrance to a particular screen within the complex or wherever is appropriate.

Upon reaching the point of service device either the user identifies, via the user interface, that e-tickets are to be used or the point of service device transmits a signal to the mobile station signalling to the user that tickets associated with the service associated with that point of service are available to that user. The user thereafter can select via a quick menu to use a ticket. This is step S402 of FIG. 4. To ensure that abuse of the e-ticket does not occur the user may then be requested to input a password number such as a wallet code. This occurs at step S403 and prevents unauthorised users from utilising e-tickets stored in the mobile station.

Once a user has correctly identified themselves the mobile station can offer the user a choice of tickets to be used. This is in the situation where the mobile station has e-tickets stored for a number of different services. This is shown at step S404 where the notional user has a choice of accessing three different films at that cinema. The user identifies which film, comprising the service, is to be accessed by selecting the required service using a menu based options list and interacting with the user interface. Selection of the service by the user thereafter initiates a process in the mobile station whereby e-tickets associated with that service or with services associated with that service are identified. At step S405 this is illustrated by the user display highlighting that several tickets have been found for that film. At step S406 the user can select the transmission of the e-ticket. Between the stage of identifying that several tickets are available and transmitting the tickets the user can be asked to select the number of tickets used. Again this can be offered by displaying a number of options on the user display such as "none", "all" or "specify number" on a menu based option list. The user can therefore simply select that all tickets be transmitted to the point of sale device. After step S406 the user may be required to select a means by which the mobile station transmits the e-tickets. This is step s407 at which the user may select transmittal of the e-tickets via the Blutooth or infrared transceiver of the mobile station. Once this transmittal medium has been selected the e-tickets are transmitted (all in a single transaction) to the point of sale device. This is identified at step S408 using the user display. The point of sale device acknowledges receipt of the e-tickets and the mobile station confirms that the tickets have been sent at step 409 by displaying this fact on the user display. After this the user and any person accompanying the user whom is associated with a valid transmitted e-ticket may access the service. The user display returns to its normal standby display at S410.

Embodiments of the present invention thus enable more than one data entity associated with a service to be grouped together. This grouping can be highlighted to a potential user of a service who has a user equipment which can access a data store where the data entities are stored. The data entities, such as for example e-tickets, can be grouped together and then transmitted to an access device. Embodiments provide for a data signal sending information relating to each of the data entities in the group to be transmitted to a cooperative device or point of sale which can process the data in that signal to provide access to services. The user equipment, such as a mobile station, but not limited thereto, may be provided with various rules or any suitable artificial intelligence which enables the grouping of associated data entities to be calculated and established.

Alternative embodiments base the process of grouping data entities upon the location of the user equipment. In the case of a mobile station the location can be determined by the location of the communication network to which a user of the user equipment subscribes. Thereafter data entities which can authorise a user to access a service in that location or a location associated with that location can be identified/grouped.

In embodiments of the present invention the identification of associated data entities can take place via processing apparatus which is external to the user equipment. For example a point of sale such as a gate which provides access to a service could include the functionality to identify the user equipment, identify data entities associated with that user equipment and identify those identified data entities that are associated with the service/s offered at the point of sale. Thereafter a signal can be transmitted to the user equipment asking the user whether they wish to use the identified data entities. A user could signal back to the point of sale via the user interface and a signal from the user equipment.

Embodiments of the present invention can be implemented by adapting the vCard protocol so that each vCard is provided with a tag portion. This tag portion can be used to identify associated vCards as described above. Other forms of data entities could of course be used.

It is also noted that while the above describes preferred embodiments of the invention, variations and modifications may be made without departing from the scope of the present invention.

Having described the invention, what is claimed is:

1. A mobile user terminal comprising:
   means for receiving a signal comprising a tag portion identifying a primary service;
   means for accessing a data store of the mobile user terminal holding data entities;
   means for identifying said primary service to be provided based on said signal;
   means for identifying in said data store of the mobile user terminal a plurality of data entities associated with said identified service, including means for comparing data in a tag field of each data entity with the tag portion corresponding to said identified service;
   means for enabling a user to select which ones of said plurality of data entities is to be transmitted; and
   means for controlling a wireless interface to transmit said selected data entities in a single transaction.

2. A mobile user terminal comprising:
   a wireless interface for receiving a signal comprising a tag portion identifying a primary service;
   a transaction processor configured for accessing a data store of the mobile user terminal holding data entities, configured for identifying the primary service to be provided based on said signal, and configured for identifying in said data store of the mobile user terminal a plurality of data entities associated with said identified service including comparing data in a tag field of each data entity with the tag portion corresponding to said identified service;
   a user interface for enabling a user to select which ones of said plurality of data entities is to be transmitted; and
   a controller for controlling said wireless interface to transmit said selected data entities in a single transaction.

3. The mobile user terminal as claimed in claim 2 wherein each said data entity includes an authorisation field for enabling a user to be authenticated to access a service.

4. The mobile user terminal as claimed in claim 2 wherein each data entity provides more than one access to a service.

5. The mobile user terminal as claimed in claim 2 wherein said wireless interface further comprises:
   a receiver for receiving a signal identifying said primary service.

6. The mobile user terminal as claimed in claim 2 wherein the data store forms part of the mobile user terminal.

7. The mobile user terminal as claimed in claim 2 wherein said wireless interface comprises an infrared link.

8. The mobile user terminal as claimed in claim 2 wherein said wireless interface comprises a short range radio link.

9. The mobile user terminal as claimed in claim 2 wherein said data entity comprises an electronic ticket.

10. The mobile user terminal as claimed in claim 2 wherein said user interface further comprises;
   a display via which a user can simultaneously select said plurality of data entities.

* * * * *

UNITED STATES PATENT AND TRADEMARK OFFICE
CERTIFICATE OF CORRECTION

| | | |
|---|---|---|
| PATENT NO. | : 7,970,653 B2 | Page 1 of 1 |
| APPLICATION NO. | : 10/178936 | |
| DATED | : June 28, 2011 | |
| INVENTOR(S) | : Topi Saukkonen, Virve Inget and Panu Markkanen | |

It is certified that error appears in the above-identified patent and that said Letters Patent is hereby corrected as shown below:

On cover page, col. 2, line 6, U.S. Patent Document 6,850,901 should read --Hunter et al.--, not "Sykes et al."

Signed and Sealed this

Thirteenth Day of September, 2011

David J. Kappos
*Director of the United States Patent and Trademark Office*